(12) United States Patent
Lafferty

(10) Patent No.: US 10,107,265 B2
(45) Date of Patent: Oct. 23, 2018

(54) FOUNDATION FOR A WIND TURBINE AND METHOD OF MAKING SAME

(75) Inventor: Wallace Lafferty, Katy, TX (US)

(73) Assignee: MHI Vestas Offshore Wind A/S, Aarhus N (DK)

( * ) Notice: Subject to any disclaimer, the term of this patent is extended or adjusted under 35 U.S.C. 154(b) by 1217 days.

(21) Appl. No.: 13/880,649

(22) PCT Filed: Oct. 18, 2011

(86) PCT No.: PCT/DK2011/050395
§ 371 (c)(1),
(2), (4) Date: Oct. 28, 2013

(87) PCT Pub. No.: WO2012/052029
PCT Pub. Date: Apr. 26, 2012

(65) Prior Publication Data
US 2014/0044554 A1    Feb. 13, 2014

Related U.S. Application Data

(60) Provisional application No. 61/394,873, filed on Oct. 20, 2010.

(30) Foreign Application Priority Data

Nov. 29, 2010 (DK) .................................. 2010 70519

(51) Int. Cl.
*E02D 27/52* (2006.01)
*E02D 7/26* (2006.01)
(Continued)

(52) U.S. Cl.
CPC ............ *F03D 11/045* (2013.01); *E02D 27/42* (2013.01); *E02D 27/425* (2013.01);
(Continued)

(58) Field of Classification Search
CPC . E02D 29/02; E02D 29/0241; E02D 29/0233; E02D 29/0216; E02D 5/18;
(Continued)

(56) References Cited

U.S. PATENT DOCUMENTS 3,803,855 A * 4/1974 Malkiel ................. B65D 88/78
114/257
4,563,852 A * 1/1986 Achtenberg ........ E04G 23/0218
52/742.14
(Continued)

FOREIGN PATENT DOCUMENTS

DE     10100047 A1    7/2002
EP      2272754 A1    1/2011
(Continued)

OTHER PUBLICATIONS

European Patent Office, Office Action issued in corresponding European Application No. 11 776 076.9, dated Feb. 18, 2015, 5 pages.
(Continued)

*Primary Examiner* — Benjamin F Fiorello
*Assistant Examiner* — Edwin J Toledo-Duran

(57) ABSTRACT

A method for assembling a modular foundation of a wind turbine having a base and a plurality of foundation sections includes positioning the base of the foundation on a support surface, arranging a plurality of tensioning elements so as to extend from the base to a second location spaced from the base, and stacking a plurality of foundation sections on the base by guiding the foundation sections from the second location toward the base using the tensioning elements. A modular wind turbine foundation includes a base positioned on the seabed; a plurality of tensioning elements extending
(Continued)

from the base to a location adjacent the surface of the water; and a plurality of serially stacked foundation segments on top of the base.

18 Claims, 10 Drawing Sheets

(51) Int. Cl.
*E02D 27/00* (2006.01)
*F03D 11/04* (2006.01)
*E02D 27/42* (2006.01)
*E04H 12/34* (2006.01)
*F03D 13/20* (2016.01)

(52) U.S. Cl.
CPC ........... *E04H 12/342* (2013.01); *F03D 13/22* (2016.05); *F05B 2230/60* (2013.01); *F05B 2240/40* (2013.01); *Y02E 10/728* (2013.01); *Y02P 70/523* (2015.11); *Y10T 29/49316* (2015.01)

(58) Field of Classification Search
CPC ......... E02D 17/205; E02D 27/52; E02D 7/26; E02D 27/00
USPC .... 405/262, 284, 227, 228, 231, 232, 195.1; 114/258, 259, 260, 261, 262, 263, 264, 114/265, 266, 267
See application file for complete search history.

(56) References Cited

U.S. PATENT DOCUMENTS

| | | | |
|---|---|---|---|
| 7,156,586 B2* | 1/2007 | Nim | B63B 35/44 405/195.1 |
| 7,160,085 B2* | 1/2007 | de Roest | E04H 12/085 416/244 R |
| 7,612,462 B2* | 11/2009 | Viterna | B63B 21/50 290/42 |
| 7,674,073 B2* | 3/2010 | Heskin | E02B 17/025 405/195.1 |
| 8,169,099 B2* | 5/2012 | Roznitsky | F03D 13/40 290/44 |
| 9,359,993 B2* | 6/2016 | Garcia Maestre | F03D 13/20 |
| 2003/0161191 A1 | 8/2003 | Marshall | |
| 2004/0070210 A1* | 4/2004 | Johansen | F03B 13/12 290/43 |
| 2006/0171798 A1* | 8/2006 | Yamamoto | F03D 1/02 415/4.5 |
| 2007/0193265 A1* | 8/2007 | Skotte | F03B 13/1845 60/495 |
| 2008/0240864 A1* | 10/2008 | Belinsky | E02D 27/42 405/223.1 |
| 2009/0072544 A1* | 3/2009 | Pao | B63B 21/50 290/55 |
| 2010/0132270 A1* | 6/2010 | Willey | E02D 27/38 52/79.5 |
| 2010/0164230 A1* | 7/2010 | Belinsky | F03B 17/063 290/54 |
| 2011/0037264 A1* | 2/2011 | Roddier | B63B 35/44 290/44 |
| 2011/0138704 A1* | 6/2011 | Bagepalli | E04H 12/12 52/147 |
| 2011/0138721 A1* | 6/2011 | Bagepalli | E02D 27/42 52/299 |
| 2011/0241347 A1* | 10/2011 | Boureau | F03D 80/00 290/53 |
| 2011/0314750 A1* | 12/2011 | Nies | E04H 12/342 52/173.1 |
| 2014/0033628 A1* | 2/2014 | Lockwood | E04H 12/16 52/223.5 |
| 2014/0079490 A1* | 3/2014 | Han | E02B 17/025 405/224 |
| 2014/0237909 A1* | 8/2014 | Gupta | H01Q 1/1242 52/40 |
| 2017/0159260 A1* | 6/2017 | Stiesdal | E02D 27/425 |
| 2017/0183840 A1* | 6/2017 | Tozer | E02D 27/016 |

FOREIGN PATENT DOCUMENTS

| | | |
|---|---|---|
| GB | 2410757 A | 8/2005 |
| GB | 2423108 A | 8/2006 |
| JP | 2000283019 A1 | 10/2000 |
| WO | 2008130827 A1 | 10/2008 |
| WO | 2010003416 A1 | 1/2010 |

OTHER PUBLICATIONS

European Patent Office, International Search Report and Written Opinion issued in corresponding International Application No. PCT/DK2011/050395 dated Jan. 9, 2012, 12 pages.

Danish Patent and Trademark Office, Examination and Search Report issued in corresponding Danish Patent Application No. PA 201070519 dated Jul. 12, 2011, 6 pages.

* cited by examiner

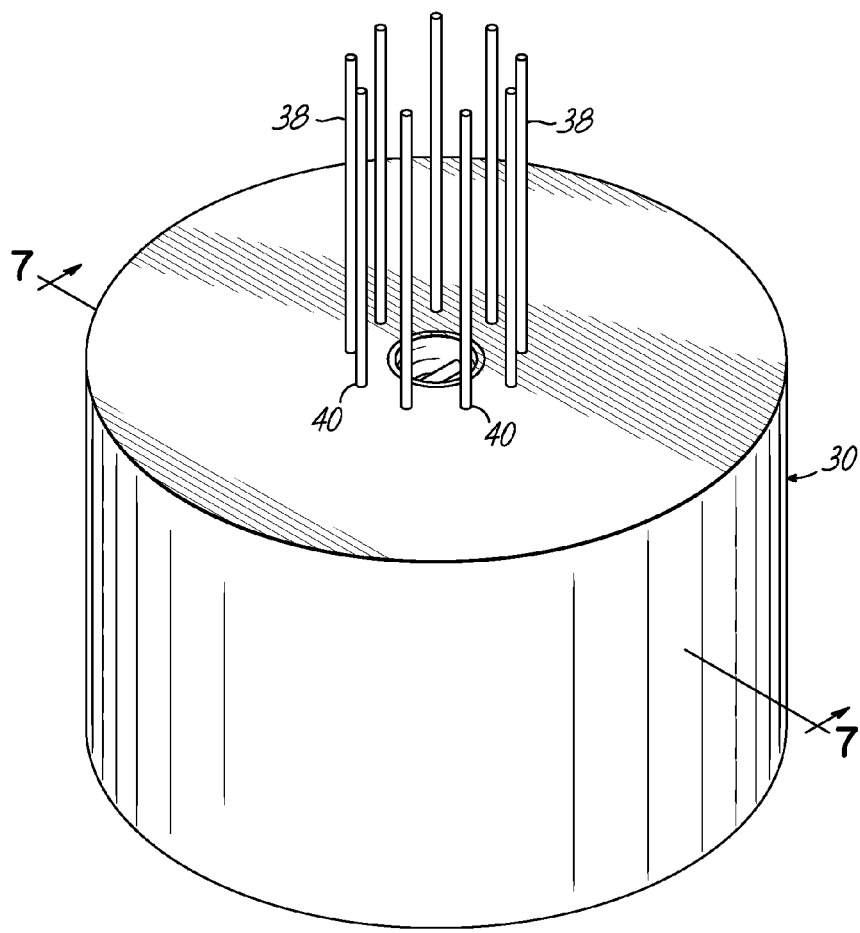
FIG. 2
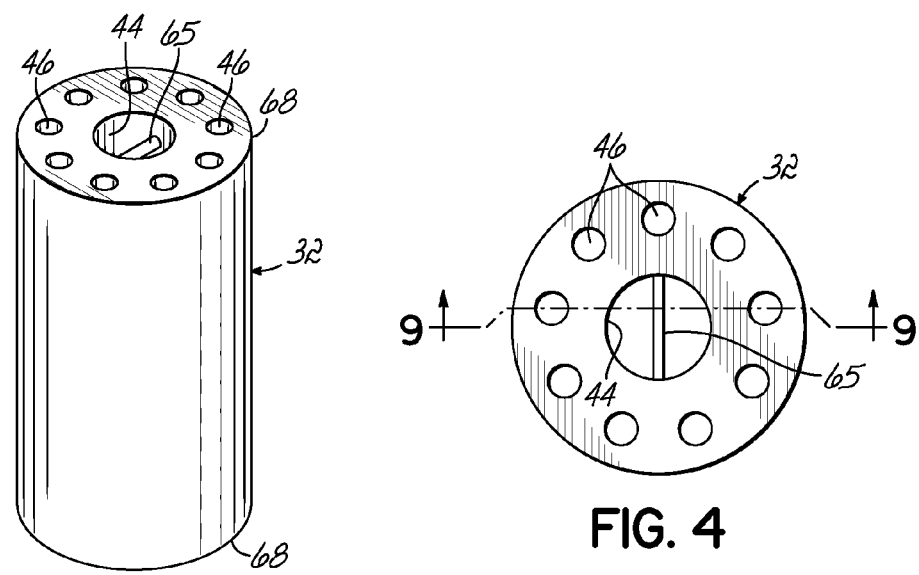
FIG. 3
FIG. 4

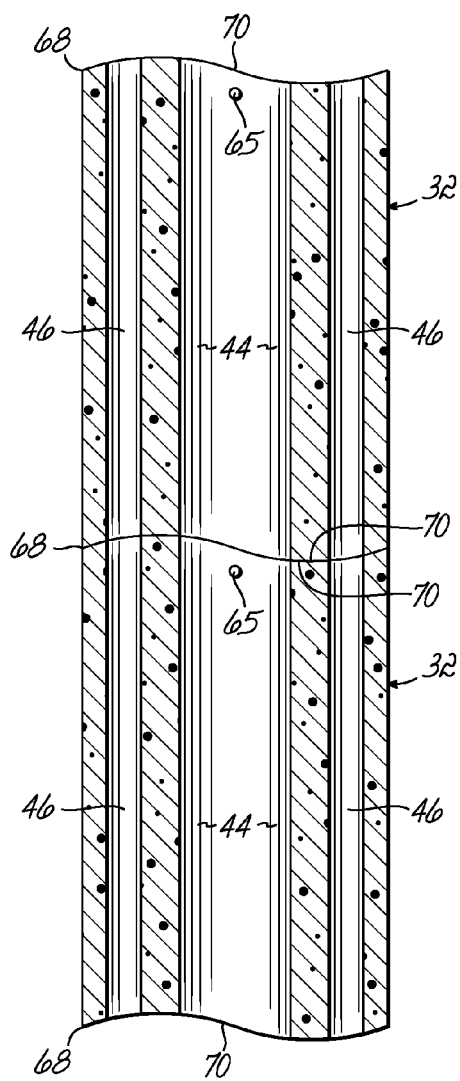
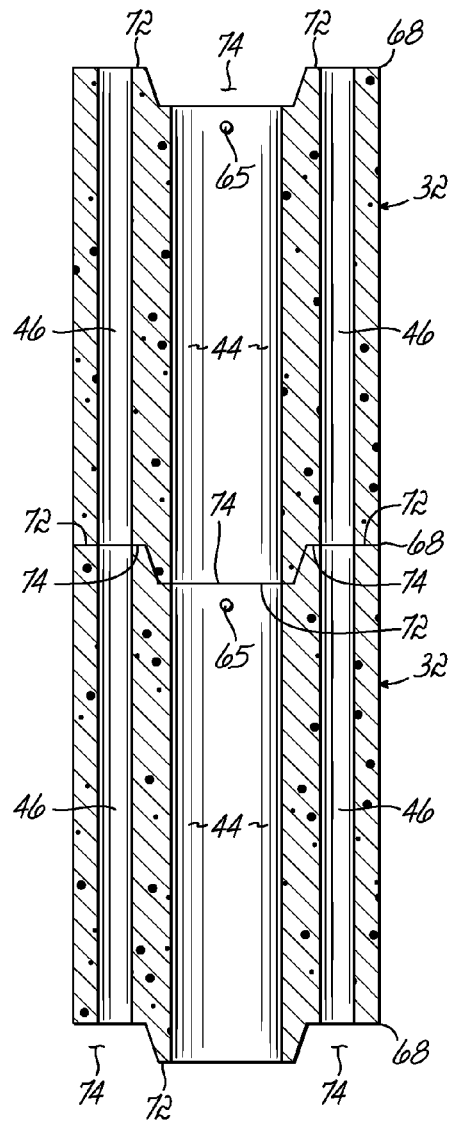
FIG. 10
FIG. 11

FOUNDATION FOR A WIND TURBINE AND METHOD OF MAKING SAME

TECHNICAL FIELD

This application relates generally to foundations for wind turbines and, more particularly, to a modular foundation and a method for making such a modular foundation for an offshore wind turbine installation.

BACKGROUND

Wind turbines for converting wind energy to electrical power have been known and applied for many years, but have found a dramatically increased application as an alternative energy source during the last couple of decades. It has become common to place wind turbines together in large groups, often counting in the hundreds, within a restricted area. Such large collections of wind turbines can provide an environmentally less desirable solution both from an aesthetic point of view and also due to the inevitable noise issues they may raise. Furthermore, the positioning of wind turbines on land may not always be an optimal placement, as it is preferable that the blades of the wind turbine be located in a laminar flow of air, which is not always obtained on land due to, for instance, the presence of hills, woods, buildings, etc. It has hence become popular to locate groups of wind turbines offshore, not too far from the coast at locations where water depths allow the wind turbines to be fixedly attached to a foundation floating in the sea or extending to the bottom of the sea. Over water, the flow of air is not disturbed by the presence of various obstacles as mentioned above and furthermore, such placements may be advantageous from an environmental point of view.

A wind turbine tower is generally 50-100 m in height with weights approaching 100 tons or more for a turbine with a 90 m rotor diameter (e.g., 2 MW unit). Due to the large dimensions of present day wind turbines, dimensions which furthermore tend to increase due to the relation between the diameter of the rotor and the maximum electrical power which the wind turbine can provide; the forces formed by rotational movement of the wind turbine blades; and the very large surface of the tower being exposed to the wind, it is vitally important that the wind turbine be provided with a stable foundation. This is not in principle a problem for wind turbines located onshore, but becomes more problematic in connection with offshore wind turbine installations.

For relatively shallow water depths (e.g., up to about 25 m), one solution is to mount the tower of the wind turbine on a suitable construction of pillows and grids, which are in turn fixed to a firm foundation on the bottom of the sea. For applications having increased water depths, the options become more limited. By way of example, for medium water depths of up to about 100 m, various floating foundations have been utilized to support the wind turbine. In this regard, WO 01/73292 discloses a floating offshore wind power installation. Such floating foundations, however, may be relatively complex in their design, expensive to construct and assemble, and difficult to install in the sea.

Alternative designs, however, may include pile foundations or gravity-based foundations. In each of these cases, the foundation is typically formed as a one-piece structure, such as quayside, and then subsequently transported to the offshore installation site and positioned within the sea. While this may be acceptable for shallow water depths, for medium water depths, the foundations are extremely large in size (e.g., over 100 m in length) and the transport and installation of such large structures is complex and costly. By way of example, to accommodate the sheer size of the one-piece foundations, heavy lift crane vessels are typically used to unload the foundation and locate it on the seabed. Additionally, it may be difficult to control and guide the large, one-piece foundation as it is being lowered toward the seabed. Furthermore, these foundations may utilize ballasts or other devices to help sink and stabilize the foundation and may also require costly preparation of the seabed prior to installation.

Accordingly, there is a need for an improved offshore foundation which can be transported to an offshore installation site, assembled, and installed on the seabed in a less costly, more efficient manner.

SUMMARY

To address these and other deficiencies in existing techniques a method of assembling a foundation for an offshore wind turbine installation, the foundation having a modular design including a base and a plurality of foundation sections, involves: lowering the base of the foundation through a body of water so as to position the base on a seabed; arranging a plurality of tensioning elements so as to extend from the base to a second location positioned adjacent a surface of the body of water; threading an end of the tensioning elements at the second location through bores formed in a foundation section and lowering towards the base so that movement of the foundation section toward the base is guided by the tensioning elements; and repeating the threading and lowering steps to stack a plurality of foundation sections on the base and thereby assemble the wind turbine foundation.

The second location is preferably above the surface of the body of water, so as to be accessible by a vessel, for example. In this way, the foundation sections may be threaded onto the tensioning elements topside and then lowered into the water.

The tensioning of the tensioning elements may be done after having stacked the foundation segments, and also done above the surface of the body of water, for example from a vessel.

In a further aspect a method of assembling a modular foundation for a wind turbine having a base and a plurality of foundation sections includes positioning the base of the foundation on a support surface; arranging a plurality of tensioning elements so as to extend from the base to a second location spaced from the base; and stacking a plurality of foundation sections on the base by guiding the foundation sections from the second location toward the base using the tensioning elements. Each of the foundation sections includes a plurality of bores formed through the sections and the foundation sections are threaded sequentially onto an end of the tensioning elements at the second location so that movement of the sections toward the base is guided by the tensioning elements.

In a further aspect, the tensioning elements may be used to, in essence, provide a self-alignment feature for the bores extending through the plurality of foundation sections. Subsequent to stacking the foundation elements and with the bores aligned, the bores may be filled with a filler material to protect the tensioning elements from, for example, a water environment. Similarly, each of the foundation sections may also include a central passageway inboard of the bores and these passageways may become self-aligned as a result of guiding the foundation sections with the tensioning elements. Subsequent to stacking the foundation elements and with the central passageways aligned, the passageways may be filled with a filler material to increase the weight, as thus stability, of the overall foundation. Once the foundation sections are suitably stacked, the tensioning elements may be tensioned to increase the strength and structural integrity of the foundation. In one aspect of the invention, such post-tensioning may be accomplished at the top end of the foundation.

In one aspect, the second location may be above the surface of the water so as to be accessible by a vessel, for example. In this way, the foundation sections may be threaded onto the tensioning elements topside and then lowered into the water. Additionally, the tensioning of the tensioning elements may also be done topside. With such a foundation assembled, a wind turbine may be erected on the foundation.

In still a further embodiment, a foundation for an offshore wind turbine installation includes a base positioned on the seabed of a body of water; a plurality of tensioning elements; and a plurality of serially stacked foundation segments on top of the base. Each tensioning element includes a first end permanently embedded within the base and a second end that is adjacent the surface of the body of water. Additionally, each foundation section has a plurality of bores each of which is configured to receive a respective one of the plurality of tensioning elements therethrough. In an exemplary embodiment, the stacked foundation sections extend to a location above the surface of the body of water.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

FIG. 2 is a perspective view of a base of the foundation shown in FIG. 1;

FIG. 3 is a perspective view of a foundation section of the foundation shown in FIG. 1;

FIG. 4 is a top plan view of the foundation section shown in FIG. 3;

FIG. 10 is a partial cross-sectional view of adjacent foundations sections having interlocking features in accordance with a first embodiment;

FIG. 11 is a partial cross-sectional view similar to FIG. 10, but illustrating a second embodiment of interlocking features;

DETAILED DESCRIPTION

Figure 1:
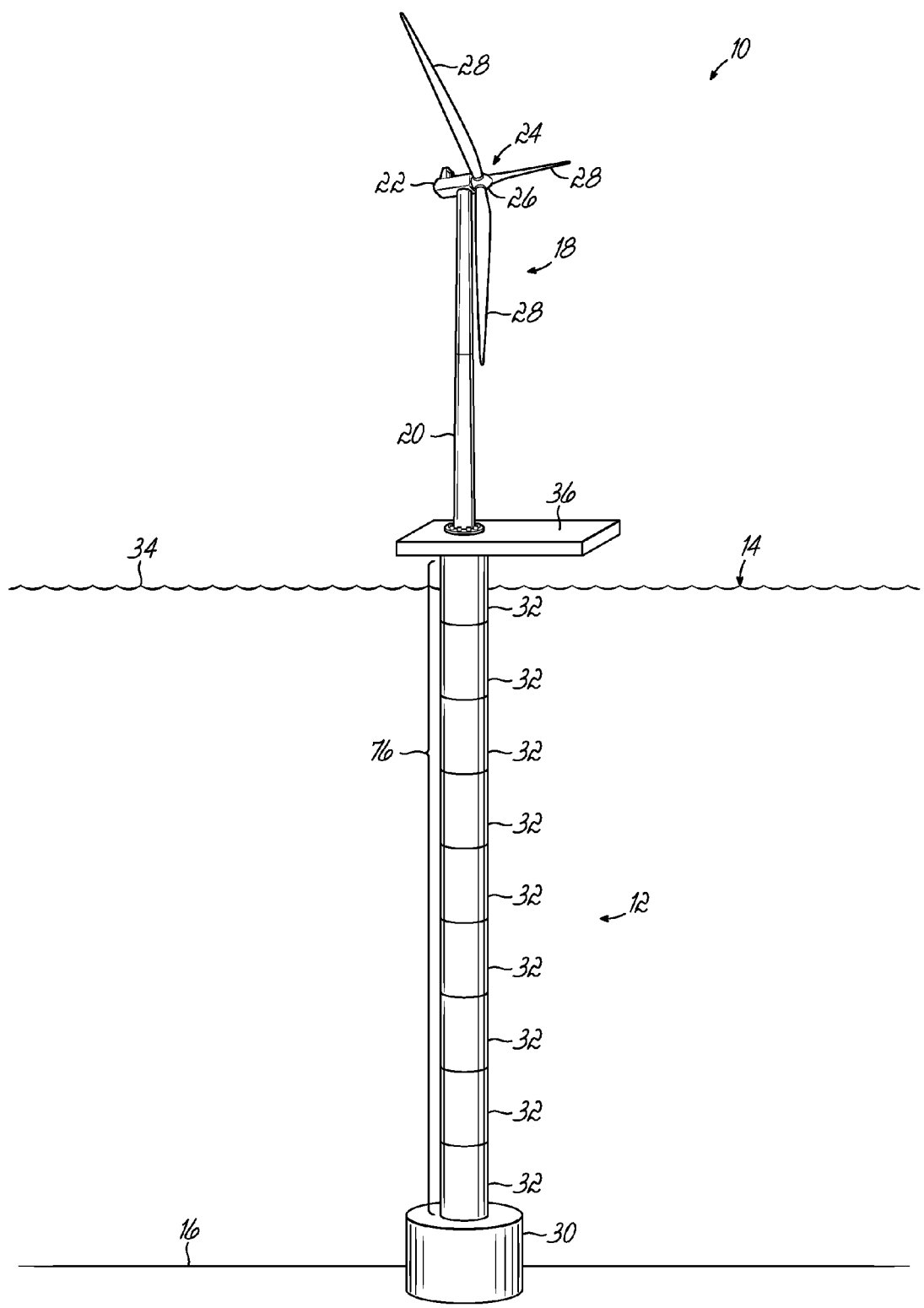
FIG. 1 is perspective view of an offshore wind turbine installation having a foundation in accordance with an embodiment of the invention.

With reference to FIG. 1, an offshore wind turbine installation 10 includes a foundation 12 generally disposed in a body of water 14 and supported by the seabed 16, and a wind turbine 18 fixedly secured to the foundation 12. The wind turbine 18 includes a tower 20, a nacelle 22 disposed at the apex of the tower 20, and a rotor 24 operatively coupled to a generator (not shown) housed inside the nacelle 14. The rotor 24 includes a central hub 26 and a plurality of blades 28 that project outwardly from the central hub 20 at locations circumferentially distributed thereabout. The blades 28 are configured to interact with the passing air flow to produce lift that causes the central hub 26 to spin about its central axis. In accordance with embodiments of the invention, the foundation 12 is designed so as to provide a lower cost, less complex alternative to existing methods and foundations used in medium water depth wind turbine installations. More particularly, foundation 12 has a modular design that overcomes many of the drawbacks of existing foundations and their installation.

In this regard and in reference to FIGS. 1-4, foundation 12 includes a base 30 configured to be supported on the seabed 16, and a plurality of serially stacked foundation sections 32 arranged on top of the base 30 and configured to extend to adjacent the surface 34 of the water 14. In one embodiment, for example, the foundation sections 32 may extend slightly above the surface 34 of the water 14, as illustrated in FIG. 1. The foundation 12 may further include a platform 36 to which the wind turbine 18 is secured. In one embodiment, foundation 12 is configured as a gravity foundation wherein the collective weight of the foundation 12 sufficiently stabilizes the wind turbine 18 relative to the seabed 16. In this way, the costs associated with piles, ballasts, extensive seabed preparation, etc. may be avoided or at least reduced. However, unlike other gravity foundations, these cost benefits may be achieved while also minimizing transportation and assembly costs, as will now be explained.

As illustrated in FIGS. 1 and 2, the base 30 is configured to rest on the seabed 16 and, in one embodiment, may be formed as a generally solid body having a generally cylindrical configuration. Although the base 30 is shown and described as being generally cylindrical, it should be recognized that the base 30 may have a wide range of shapes including rectangular, square, triangular, octagonal, etc (not shown). By way of example and not limitation, the base 30 may be formed from concrete, reinforced concrete, or other materials suitable for long term submersion in a water environment including, for example, a salt water environment. The cross dimension and the height of the base 30 may vary depending on the particular wind turbine installation (e.g., water depth, general water conditions, wind turbine size, etc.). However, as illustrated in FIG. 1, the base 30 may be generally larger and heavier than the foundation sections 32 that make up a significant portion of the foundation construction. As is recognized, configuring the base 30 larger than the foundation sections 32 provides for a more stable modular configuration.

Figure 5:
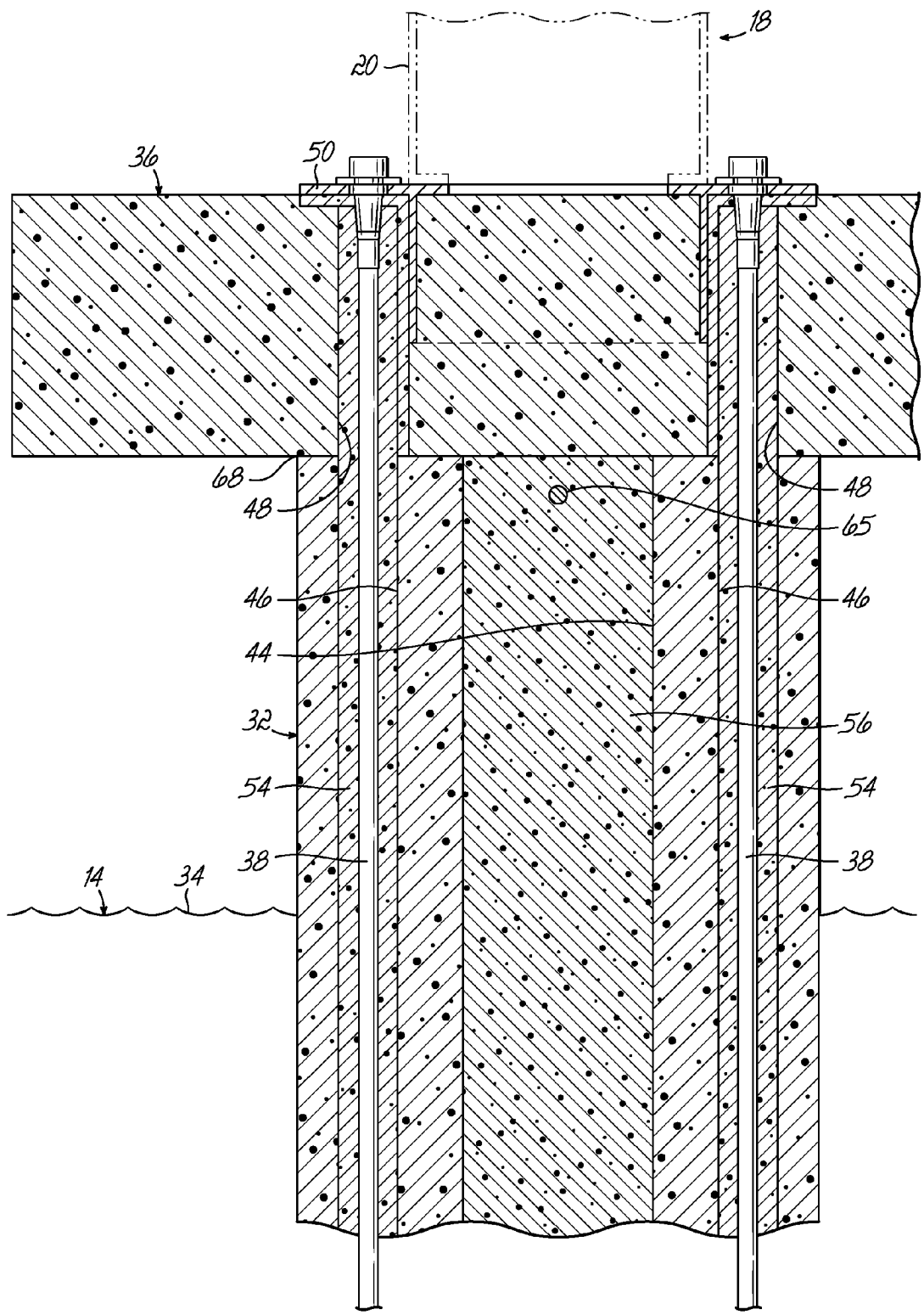
FIG. 5 is a partial cross-sectional view of the foundation shown in FIG. 1 adjacent a top end of the foundation.

Due to the relatively large size of foundation 12 as a whole, foundation 12 includes tensioning elements that enhance the strength and structural integrity of the overall foundation 12. To this end, and in accordance with one embodiment of the invention, the foundation 12 includes a plurality of tensioning cables 38 extending along at least a portion of the length of the foundation 12. For example, in one embodiment, the tensioning cables 38 may extend from the base 30 to adjacent the surface 34 of the water 14, such as at platform 36 (FIG. 5). More particularly, and as illustrated in FIG. 2, base 30 includes a plurality of tensioning cables 38 having a first end 40 securely embedded within the base 30 and extending upwardly therefrom in a direction away from the seabed 16 and toward surface 34. By way of example, the ends 40 of the tensioning cables 38 may be positioned in a concrete pre-form prior to pouring the concrete such that the ends 40 are securely embedded therein upon curing of the concrete that forms base 30. Alternatively, the ends 40 may be inserted into pre-formed (e.g., during casting) or post-formed bores in base 30 and the bores subsequently filled with concrete or other suitable filler material that secures the ends 40 to base 30 (not shown). Still further, the base 30 may include various securing devices coupled thereto configured to capture the ends 40 of tensioning cables 38 upon their insertion therein (not shown). Other processes, devices, etc. may also be used to securely fix the ends 40 of tensioning cables 38 to base 30.

As illustrated in FIGS. 1, 3 and 4, a significant portion of the foundation 12 is formed by a plurality of serially stacked foundation sections 32 located on top of base 30. Each of the foundation sections 32 may be formed as a generally tubular body having a generally cylindrical configuration and a central passageway 44 (e.g., the foundation sections may be hollow). A plurality of throughbores 46 may be disposed outboard of the central passageway 44 and be configured to receive a tensioning cable 38 therethrough. Similar to above, although the foundation sections 32 are shown and described as being generally cylindrical, it should be recognized that the sections 32 may have a wide range of shapes including rectangular, square, triangular, octagonal, etc (not shown). The central passageway 44 may also have a wide range of shapes, which may or may not correspond to the overall shape of the foundation sections 32.

The foundation sections 32 may be formed from concrete, reinforced concrete, or other materials suitable for long term submersion in a water environment. The cross dimension and the height of the foundation sections 32 may vary depending on the particular wind turbine installation or other considerations. For example, the size of the foundation sections 32 may be selected in a manner that optimizes their transport to the offshore site. In any event, the size of the foundation sections 32 are such that the heavy lift crane vessels typically used in medium water wind turbine installations are not needed for assembly and/or placement of the foundation sections, as will be discussed in more detail below.

As illustrated in FIGS. 1 and 5, the foundation sections 32 are stacked one on top of another until the foundation 12 extends to adjacent the surface 34 of the water 14, such as above the surface 34 of the water 14. As noted above, a platform 36 may be positioned atop the last foundation section 32. In this regard, the platform 36 may include throughbores 48 that are aligned with the throughbores 46 in the foundation sections 32 so as to receive the tensioning cables 38 therethrough. In one embodiment, the platform 36 may include a steel plate 50 that facilitates post-tensioning of the tensioning cables 38.

Figure 13:
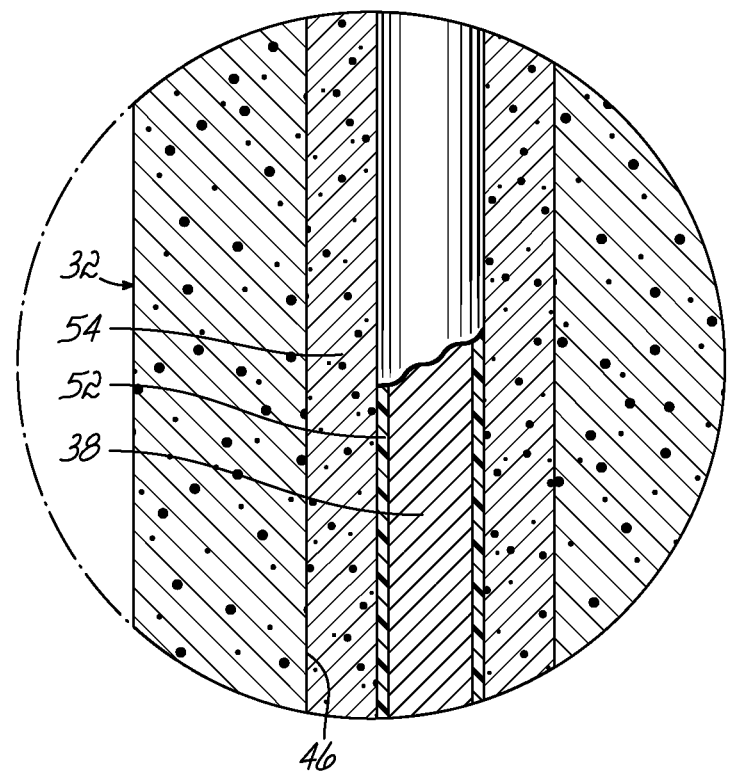
FIG. 13 is an enlarged view of the circled portion shown in FIG. 12.

To protect the tensioning cables 38 from the water, the cables 38 may be clad in polyurethane or other protective covering 52 (FIG. 13). Additionally, the throughbores 46 in the collection of foundations sections 32 (and possibly the throughbores 48 in the platform 36), which receive the tensioning cables 38, may be filled with suitable filler material 54 that further protects the tensioning cables 38 from the negative effects of the water environment. For example, the throughbores 46, 48 may be filled with a treated concrete suitable for sealing the cables 38 from the water. Furthermore, the central passageway 44 in the collection of foundation sections 32 may also be filled with concrete or other suitable filler material 56. Filling the central passageway 44 with a filler material 56 increases the overall weight of the foundation 12, further increasing the stability of the wind turbine 18 mounted to foundation 12.

Figure 6:
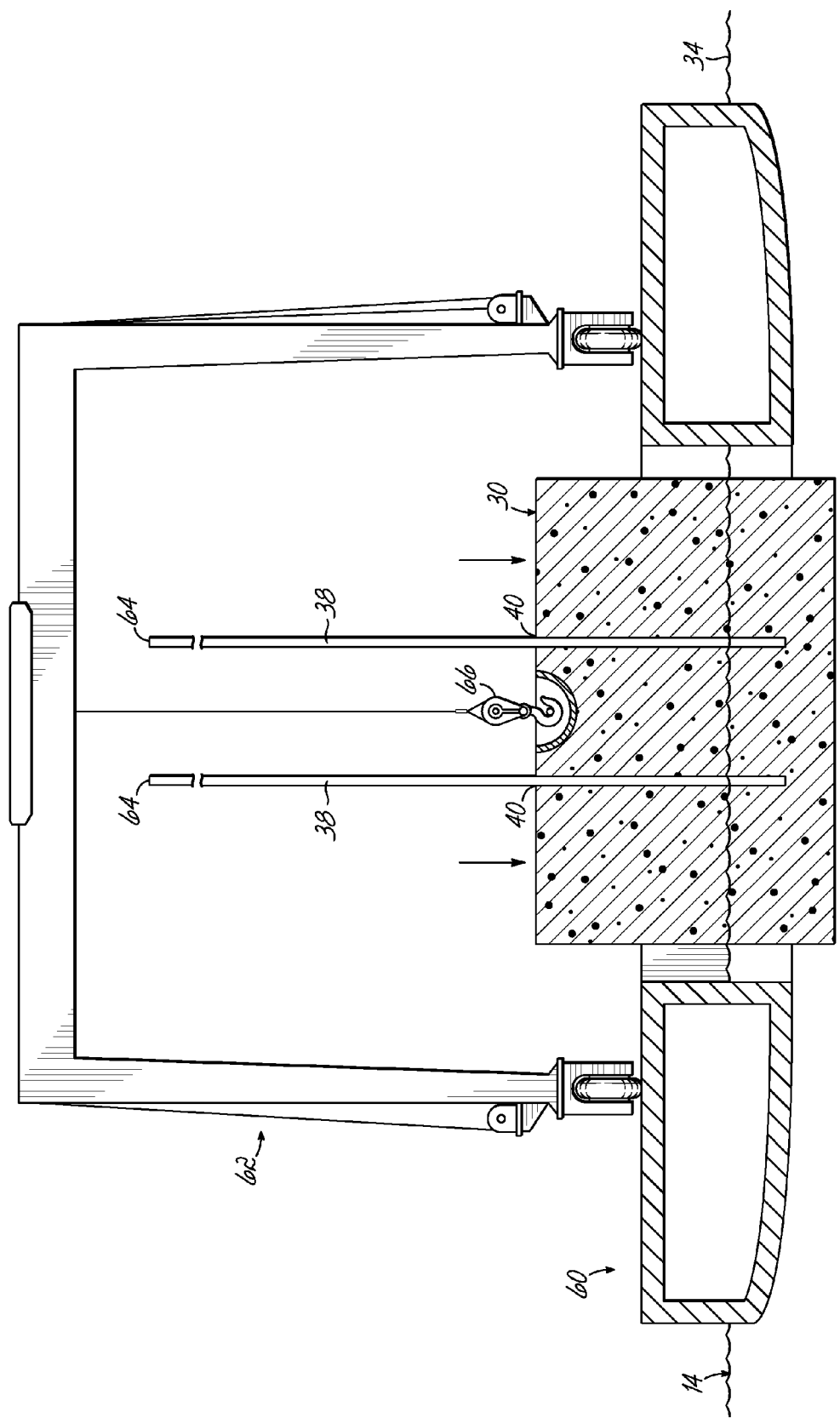
FIG. 6 is a partial cross-sectional view illustrating the initial stages of placement of the base of the foundation on the seabed during assembly.

A method of forming or assembling foundation 12 will now be explained in greater detail. In accordance with one aspect of the invention, the modular nature of foundation 12 avoids the need to use a heavy lift crane vessel to erect the foundation 12. Instead, and as illustrated in FIG. 6, it is contemplated that a vessel 60 having a relatively small gantry crane 62 may be sufficient to erect the foundation 12. In this regard, the crane 62 does not have to be sized so as to lift the entire foundation 12, as in previous methodologies, but may be sized to lift the heaviest component thereof, which in the normal course is expected to be base 30. As the base 30 is much smaller in size and weight in comparison to the overall foundation 12, a much smaller crane may be utilized to assemble the foundation 12. The utilization of such a smaller crane significantly reduces the transportation and assembly costs of the offshore wind turbine installation 10. Although a gantry crane 62 is illustrated in the figures and described in an exemplary embodiment, it should be recognized that other cranes may also be used to erect the foundation 12. In any event, it is expected that the particular crane utilized will be significantly smaller than the heavy lift vessel cranes currently used such that a similar reduction in transportation and assembly costs would result.

Figure 7:
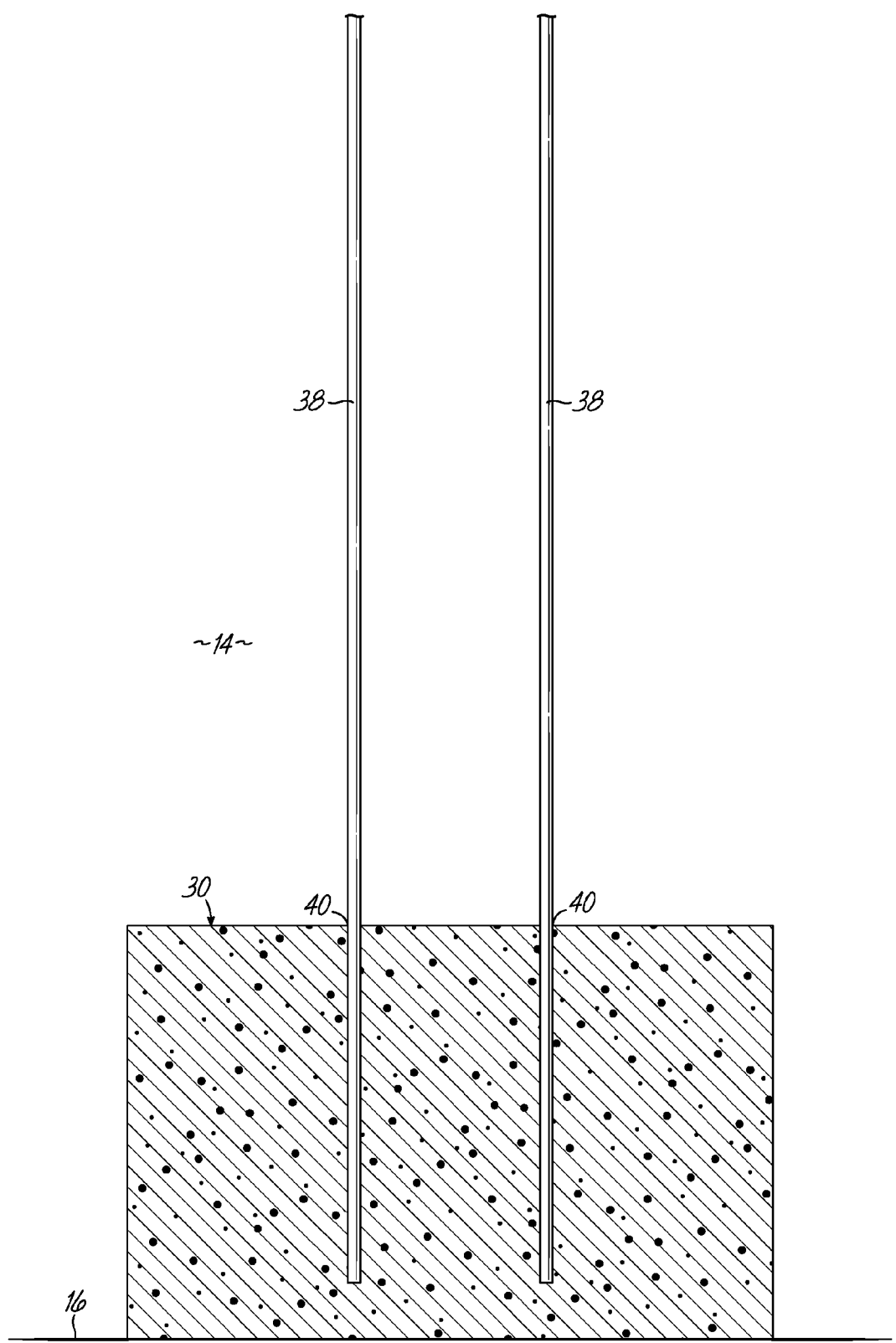
FIG. 7 is a partial cross-sectional view similar to FIG. 6, but illustrating the base resting on the seabed.

In regard to the particulars of the exemplary methodology and as illustrated in FIGS. 6 and 7, in a first step, the base 30 of foundation 12 may be lowered down to the seabed 14 using, for example, crane 62. As noted above, the tensioning cables 38 have a first end 40 embedded or otherwise coupled to base 30, which is preferably done prior to the base 30 being submersed in the water 14. However, in alternative embodiments, the first end of the tensioning cables 38 may be coupled to base 30 after submersion. Thus, in accordance with an exemplary method, the base 30 is positioned on the seabed 16 such that the tensioning cables 38 extend from the base 30 toward the surface 34. For example, a second end 64 of the tensioning cables 38 may terminate adjacent surface 34. In one embodiment, the second end 64 of cables 38 may be positioned above the surface 34 of the water 14. It should be recognized that prior to positioning the base 30 on seabed 16, and depending on the particular conditions of the seabed 16 at the wind turbine installation site, some preparation of the seabed 16 may have to be performed to ensure the base 30 is properly supported thereon. Such preparation techniques are generally known in the industry and will not be explained in further detail herein.

Figure 8:
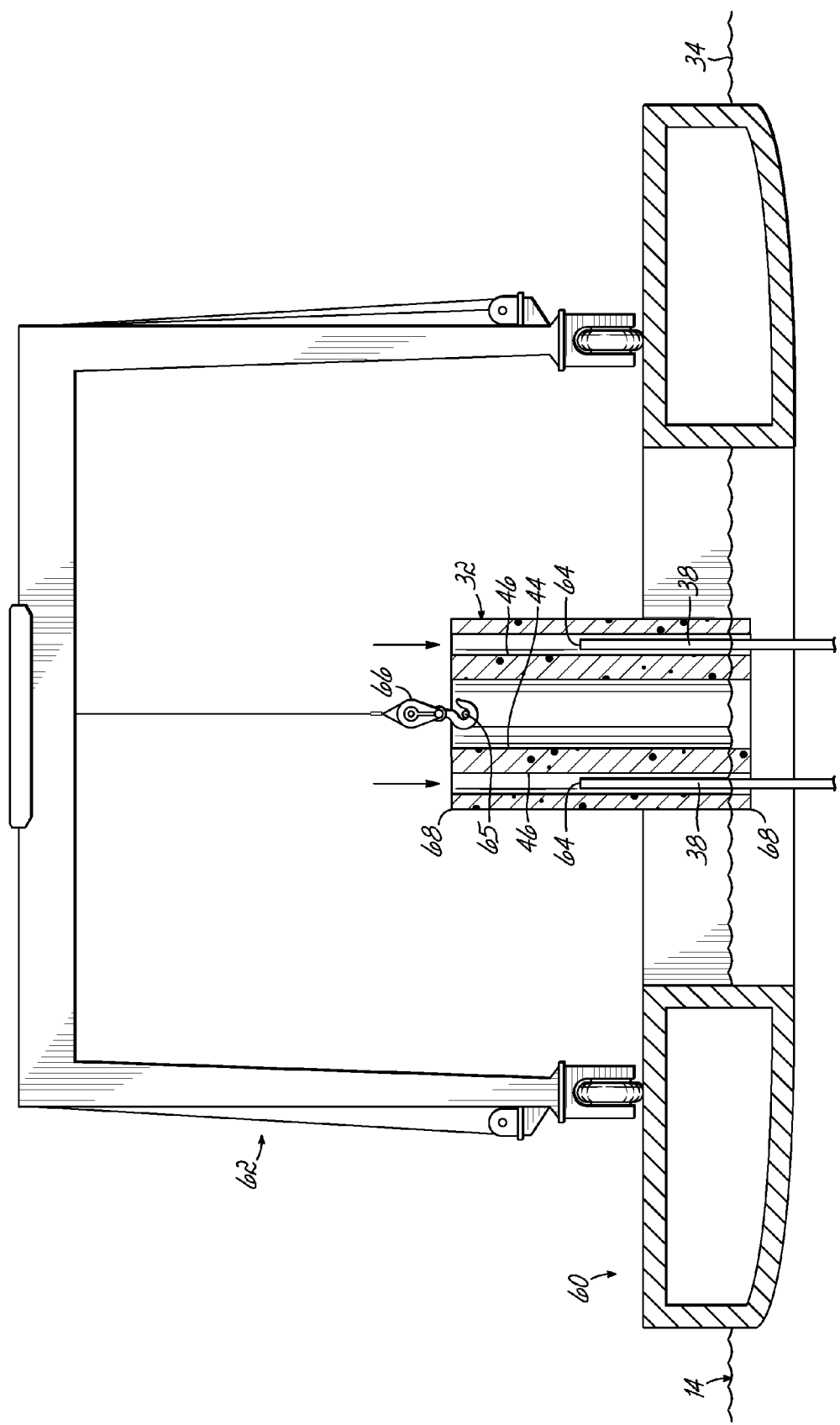
FIG. 8 is a partial cross-sectional view illustrating the initial stages of placement of the foundation sections of the foundation on the base during assembly.
Figure 9:
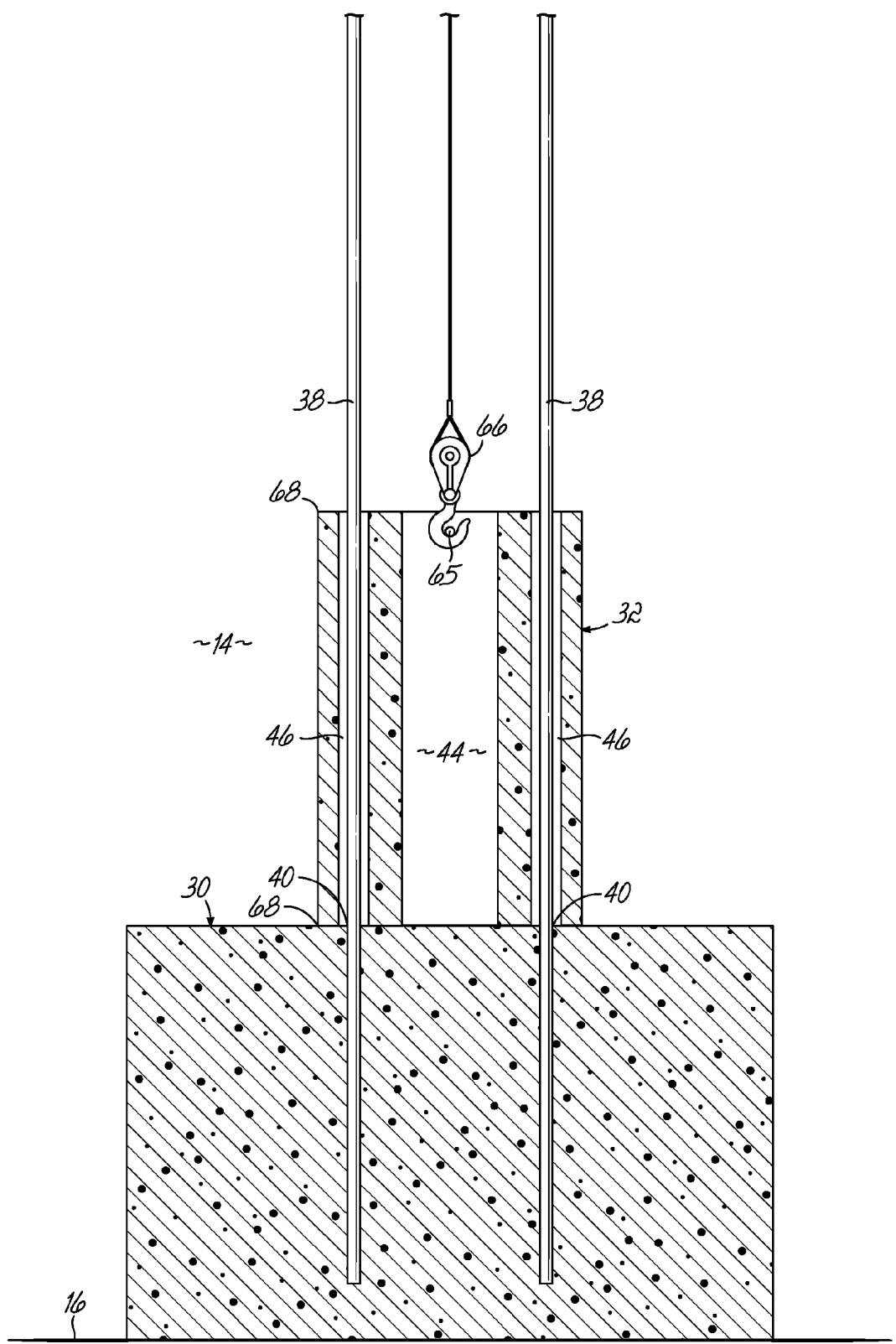
FIG. 9 is a partial cross-sectional view similar to FIG. 8, but illustrating the foundation section on the base.

As illustrated in FIGS. 8 and 9, after the base 30 of foundation 12 has been positioned on the seabed 16, a first foundation section 32 may be lowered through the water 14 using, for example, crane 62 and positioned on top of the base 30. In this regard, the foundation sections 32 may include a connecting element, such as cross bar 65 extending across central passageway 44 adjacent at least one of the ends of foundation section 32. The connecting element is configured to cooperate with a corresponding connecting element on gantry crane 60 to allow crane 60 to move the foundation sections 32. For example, the gantry crane 62 may include a hook 66 configured to engage cross bar 65 for lifting, moving or otherwise manipulating foundation sections 32. Those of ordinary skill in the art may recognize a wide variety of other connecting elements that allow crane 62 to move foundation sections 32. Such connecting elements may also be used to manipulate base 30.

In a particularly advantageous aspect of the invention, the tensioning cables 38 are used as a guide for guiding the foundation section 32 from a location adjacent surface 34 of the water 14 to its proper position in foundation 12 (e.g., such as beneath the surface 34 of the water 14). In this regard, the second ends 64 of the tensioning cables 38 may be inserted through bores 46 (i.e., threaded through bores 46) of the foundation section 32 topside (e.g., above the surface 34), such as on vessel 60 (FIG. 8). After threading the cables 38 through bores 46, the foundation section 32 may be lowered by crane 62 into position on top of the base 30. As noted above, as the foundation section 32 is being lowered beneath the surface 34 of the water 14, the tensioning cables 38 essentially limit its movement and guide the section 32 into place. Such a "bead on a string" approach exemplified by the present method tremendously simplifies and increases the speed of the assembly process of foundation 12. Of course after the placement of the first foundation section 32, another foundation section 32 may be threaded onto the tensioning cables 38 and lowered into place on top of base 30 (and on top of the prior foundation section). This process may continue until the foundation 12 is at its desired height, such as extending above the surface 34 of the water 14.

Figure 12:
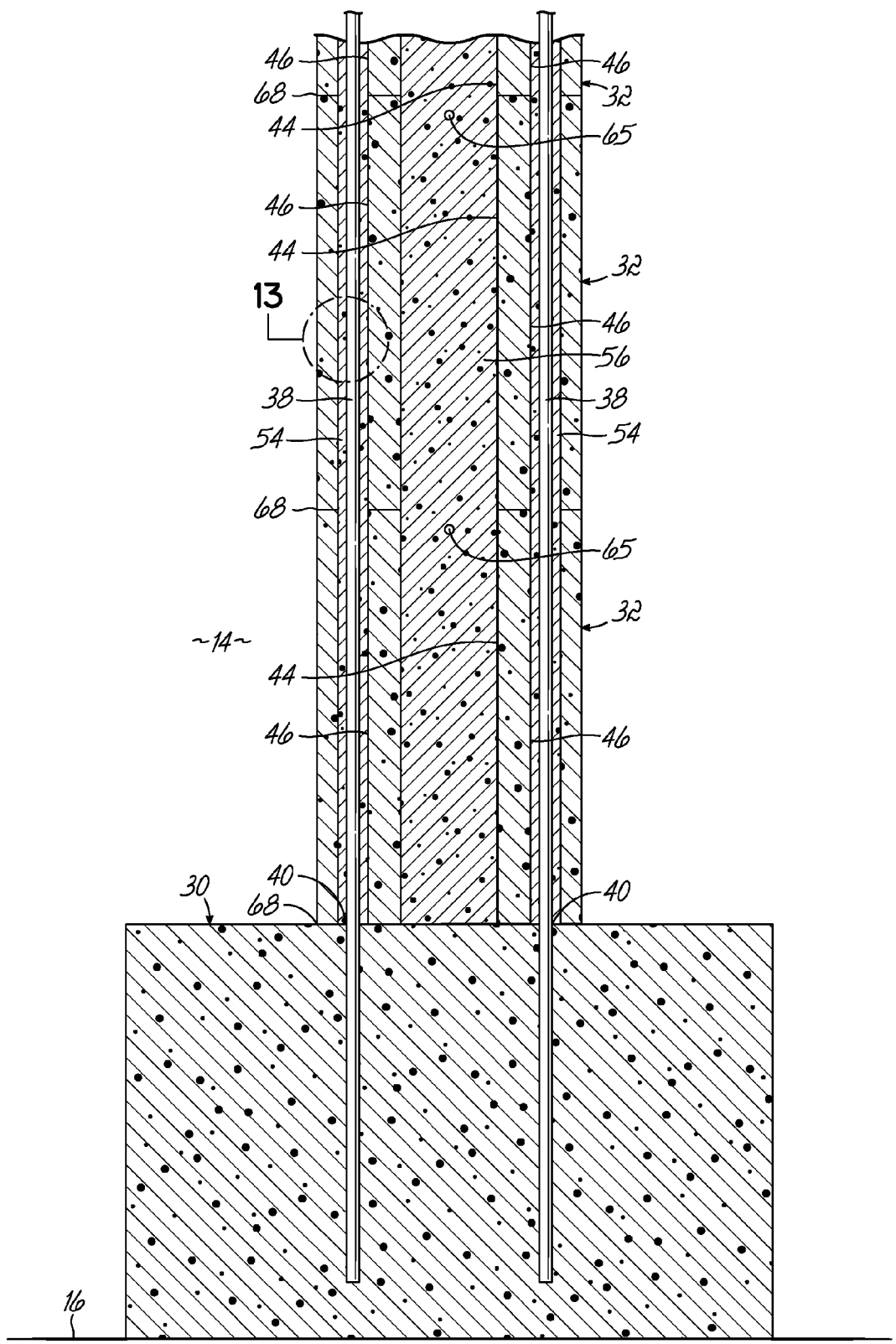
FIG. 12 is a partial cross-sectional view of the assembled foundation.

Using the tensioning cables 38 as a guide for placing the foundation sections 32 provides additional benefits. For example, for purposes mentioned above and discussed further below, it is considered important that after the foundations sections 32 are stacked, the throughbores 46 of the sections 32 be substantially aligned so as to form one generally continuous conduit (FIG. 12). Using the tensioning cables 38 as a guide essentially provides a self-alignment feature such that the throughbores 46 are aligned upon placement of the foundation sections 32, i.e., the sections 32 are in essence automatically aligned as a result of the particular methodology described above. Accordingly, small, frustrating, and time-consuming adjustments to the placement of the foundation sections 32 during assembly so as to align the bores 46 of adjacent sections 32 may be avoided.

In addition to the above, and to further facilitate proper alignment of adjacent foundation sections 32, the ends 68 of the foundation sections 32 may be shaped to facilitate seating of adjacent sections and alignment of throughbores 46. By way of example, and as illustrated in FIGS. 10 and 11, in various embodiments the ends 68 of the sections 32 may not be generally planar, but instead may be distorted or convoluted in some manner to provide an interlocking feature to the sections 32. FIG. 10, for example, illustrates the ends 68 having a wavy pattern 70 (e.g., sinusoidal shape) formed therein. FIG. 11 illustrates the ends 68 as having alternating projections 72 and recesses 74. In this way, when two sections 32 are put end-to-end, such a during assembly of foundation 12, the positioning of one section relative to the other section must take on a certain orientation or configuration before the sections 32 may be successfully mated together. This orienting required for seating adjacent sections 32 allows the positioning of features (such as bores 46) to become predictable by virtue of the seating. In addition or alternatively, the ends 68 may include other interlocking features, such as tongue and groove features (not shown), that prevent or minimize relative movement between two adjacent foundation sections 32.

Due to one or more of these above-described features, the foundation 12 may be assembled such that the throughbores 46 and/or the central passageways 44 of the foundation sections 32 are aligned so as to form essentially one continuous conduit along the length of the foundation 12, as illustrated in FIG. 12. Additionally, the features described above may result in the outer surface 76 of the foundation 12 being relatively smooth.

In a further aspect, once the foundation sections 32 are stacked to a desired height, the platform 36 may be positioned atop the last foundation section 32. In this regard, the tensioning cables 38 may similarly be threaded through the throughbores 48 formed therein and the platform 36 guided into place thereby. This may be done, for example, by the gantry crane 62 or by another relatively small-sized crane. In any event, the tensioning cables 38 again provide a self-alignment feature that, in essence, aligns the throughbores 48 in the platform 36 with the throughbores 46 in the foundation sections 32.

With the platform 36 in place, the tensioning cables 38 may be tensioned. Thus, in the exemplary embodiment the tensioning cables 38 operate as post-tensioning elements which are tensioned after assembly of the foundation 12. In this regard, once the platform 36 is in place, the cables 38 may be tensioned, such as by pulling on the second ends 64 or by other known methodologies, so as compress the foundation 12 together. As is understood in the art, tensioning cables 38 significantly improve the strength and structural integrity of the foundation 12. Unlike many conventional post tensioning techniques, however, which impose tension at the bottom or lower end of the structure, in the present embodiment, the tension is applied at the top or upper end of the structure. Of course in the instant implementation, tensioning from the upper end may be advantageous in that it may be done adjacent surface 34, such as from a surface of a vessel, instead of having to be done adjacent the seabed 16. In any event, the tensioning cables 38 may be tensioned and appropriately terminated so as to maintain the tension formed therein.

After the cables 38 are tensioned, or alternatively prior to tensioning the cables 38, the througbores 46 may be filled with treated concrete or other filler materials 54 to further protect the cables 38 from the water environment. In this regard, a fill pipe (not shown) may be inserted into the throughbores 46 so as to dispense the fill material 54 into the throughbores 46. The fill material 54 is configured to have a higher density than the water such that the fill process forces the water out of the bores 46 as the bores 46 are being filled. Once the fill material 54 cures, the tensioning cables 38 are further protected from the corrosive or other undesirable effects of the water. A similar process may also be used to fill the elongate conduit formed by the plurality of aligned central passageways 44 of the foundation sections 32 with fill material 56. As noted above, this process may be utilized to increase the overall weight of the foundation 12 and thus enhance its stability.

With the foundation 12 fully assembled as described above, the wind turbine 18 may be assembled and coupled to foundation 12 in accordance with methodologies known in the art. Through these known methodologies, and in one embodiment, the wind turbine tower 20 may be positioned on the platform 36 and securely fastened thereto by, for example, a plurality of nuts threadably coupled to corresponding throughbolts projecting from the platform 36 and extending through holes in a flange at the lower end of the tower 20.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, while the methods described above were directed to offshore foundation construction, similar methodologies may be employed for onshore construction. The invention in its broader aspects is therefore not limited to the specific details, representative apparatus, representative methods, and illustrative examples shown and described. Accordingly, departures may be made from such details without departing from the spirit or scope of the general inventive concept.

The invention claimed is:

1. A method of assembling a foundation for an offshore wind turbine installation, the foundation having a modular design including a base and a plurality of foundation sections, the method comprising:
    lowering the base of the foundation through a body of water so as to position the base on a seabed;
    arranging a plurality of tensioning elements so as to extend from the base to a second location positioned adjacent a surface of the body of water;
    threading an end of each of the plurality of tensioning elements at the second location through bores formed in one of the plurality of foundation sections and lowering the foundation section towards the base so that movement of the foundation section toward the base is guided by the plurality of tensioning elements; and
    repeating the threading and lowering steps to stack each of the plurality of foundation sections on the base and thereby assemble the foundation for the offshore wind turbine installation.

2. The method of claim 1, wherein the second location is above the surface of the body of water.

3. The method of claim 1, further comprising tensioning the tensioning elements after having stacked the plurality of foundation sections on the base.

4. The method of claim 3, wherein tensioning the tensioning elements is done above the surface of the water.

5. The method of claim 1, further comprising:
    using the tensioning elements to self-align the bores in the plurality of foundation sections; and
    filling the bores with a filler material after having stacked the plurality of foundation sections on the base.

6. The method of claim 1, wherein each of the foundation sections includes a central passageway inboard of the bores, the method further comprising:
    using the tensioning elements to self-align the central passageways in the plurality of foundation sections; and
    filling the central passageways with a filler material after having stacked the plurality of foundation sections on the base.

7. A method of constructing an offshore wind turbine installation, comprising:
    assembling the foundation for the offshore wind turbine installation according to claim 1; and
    coupling a wind turbine to the foundation.

8. The method of claim 1, wherein each of the plurality of tensioning elements extends continuously from the base to the second location.

9. A method of assembling a foundation for a wind turbine, the foundation having a modular design including a base and a plurality of foundation sections, the method comprising:
    positioning the base of the foundation on a support surface;
    arranging a plurality of tensioning elements so as to extend from the base to a second location spaced from the base, the second location located adjacent to a water surface; and
    stacking the plurality of foundation sections on the base by sequentially threading an end of each of the plurality of tensioning elements at the second location through bores formed in each of the plurality of foundation sections so that movement of each of the plurality of foundation sections from the second location toward the base is guided by the plurality of tensioning elements.

10. The method of claim 9, further comprising tensioning the tensioning elements after having stacked the plurality of foundation sections on the base.

11. The method of claim 10, wherein tensioning the tensioning elements is done from a top end of the foundation.

12. The method of claim 9, further comprising:
    using the tensioning elements to self-align the bores in the plurality of foundation sections; and
    filling the bores with a filler material after having stacked the plurality of foundation sections on the base.

13. The method of claim 9, wherein each of the foundation sections includes a central passageway inboard of the bores, the method further comprising:
    using the tensioning elements to self-align the central passageways in the plurality of foundation sections; and
    filling the central passageways with a filler material after having stacked the plurality of foundation sections on the base.

14. The method of claim 9, wherein each of the plurality of tensioning elements extends continuously from the base to the second location.

15. A foundation for an offshore wind turbine installation, comprising:
    a base positioned on the seabed of a body of water;
    a plurality of tensioning elements, each tensioning element having a first end permanently embedded within the base and a second end adjacent a surface of the body of water; and
    a plurality of serially stacked foundation sections on top of the base, each foundation section having a plurality of bores positioned internally within the foundation section and each of which receives a respective one of the plurality of tensioning elements therethrough, the stacked foundation sections extending to a location above the surface of the body of water, and wherein the tensioning elements are configured to guide the plurality of foundation sections from the second end toward the base.

16. The foundation of claim 15, wherein the base includes a cross dimension greater than the cross dimension of the plurality of foundation sections.

17. The foundation of claim 15, wherein the foundation sections have ends, confronting ends of adjacent foundation sections having non-planar interfaces that cooperate so as to orient one foundation section relative to its adjacent foundation section.

18. The foundation of claim 15, wherein each of the plurality of tensioning elements extends continuously between the first and second ends.

* * * * *